US007088857B2

(12) United States Patent
Zuniga

(10) Patent No.: US 7,088,857 B2
(45) Date of Patent: Aug. 8, 2006

(54) DYNAMIC BILEVEL THRESHOLDING OF DIGITAL IMAGES

(75) Inventor: Oscar A Zuniga, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 10/062,250

(22) Filed: Jan. 31, 2002

(65) Prior Publication Data

US 2003/0142866 A1    Jul. 31, 2003

(51) Int. Cl.
*G06K 9/00* (2006.01)
*G06K 9/34* (2006.01)

(52) U.S. Cl. ..................................... 382/172
(58) Field of Classification Search .............. 382/159, 382/164, 168, 172, 173, 175, 224, 271, 305; 358/296, 465, 520, 522, 523, 528, 530; 327/78; 702/58; 348/187, 247
See application file for complete search history.

(56) References Cited

U.S. PATENT DOCUMENTS

| | | | | |
|---|---|---|---|---|
| 3,665,326 A * | 5/1972 | Sullivan | | 327/78 |
| 4,933,869 A * | 6/1990 | Gareis et al. | | 702/58 |
| 5,093,871 A | 3/1992 | Klein et al. | | |
| 5,179,599 A | 1/1993 | Formanek | | 382/51 |
| 5,201,014 A | 4/1993 | Degi et al. | | 382/51 |
| 5,280,367 A | 1/1994 | Zuniga | | 358/462 |
| 5,454,049 A * | 9/1995 | Oki et al. | | 382/172 |
| 5,621,815 A * | 4/1997 | Talukdar et al. | | 382/159 |
| 5,649,025 A | 7/1997 | Revankar | | 382/171 |
| 5,651,077 A | 7/1997 | Dong et al. | | 382/172 |
| 5,767,978 A * | 6/1998 | Revankar et al. | | 358/296 |
| 5,781,658 A * | 7/1998 | O'Gorman | | 382/172 |
| 5,838,463 A * | 11/1998 | Gahang | | 358/465 |
| 5,878,163 A * | 3/1999 | Stephan et al. | | 382/172 |
| 5,982,944 A * | 11/1999 | Vaidyanathan et al. | | 382/271 |
| 6,593,961 B1 * | 7/2003 | Perino | | 348/187 |

FOREIGN PATENT DOCUMENTS

| | | |
|---|---|---|
| EP | 0356225 | 2/1990 |
| EP | 0499875 B1 | 11/1996 |
| EP | 0796475 B1 | 7/1999 |
| WO | WO96/02897 | 2/1996 |

OTHER PUBLICATIONS

"A Survey Of Threshold Selection Techniques"; Joan S. Weszka; Computer Graphics And Image Processing, vol. 7; pp. 259-265; 1978.
"Automatic Multithreshold Selection"; Wang & Haralick; Computer Vision, Graphics and Image Processing, vol. 25; pp. 46-67; 1984.
"A Survey Of Thresholding Techniques"; Sahoo et al; Computer Vision, Graphics and Image Processing, vol. 41; pp. 233-260; 1988.

(Continued)

*Primary Examiner*—Amir Alavi
(74) *Attorney, Agent, or Firm*—Augustus W. Winfield

(57) ABSTRACT

In a digital image, for each pixel to be thresholded, a threshold is selected from a set of thresholds. Selection may be based on relative magnitudes of the thresholds. At least one of the thresholds may be dynamic, and one of the thresholds may be constant for at least a region of the image.

6 Claims, 4 Drawing Sheets

OTHER PUBLICATIONS

"A Threshold Selection Method From Gray-Level Histograms"; Nobuyuki Otsu; IEEE Transactions On Systems, Man, And Cybernetics, vol. SMC 9, No. 1; pp. 62-66; Jan. 1979.

"Histogram Modificatoin For Threshold Selection"; Joan S. Weszka and Azriel Rosenfeld; IEEE Transactions On Systems, Man And Cybernetics, vol. SMC-9, No. 1; pp. 38-52; Jan. 1979.

* cited by examiner

DYNAMIC BILEVEL THRESHOLDING OF DIGITAL IMAGES

FIELD OF INVENTION

This invention relates generally to automated image analysis and more specifically to segmentation of images by thresholding.

BACKGROUND OF THE INVENTION

Image segmentation is a process of dividing an image into regions of interest, and includes discrimination of objects in an image from a background. Thresholding is one technique for segmentation. In bilevel thresholding, each image pixel is assigned to one of two classes according to whether its intensity (gray level or color) is greater or less than a specified threshold, resulting in a binary image. In multilevel thresholding, the entire image is thresholded multiple times, each time with a different constant threshold, resulting in multiple binary images.

One common application is optical character recognition (OCR), where image pixels are typically segmented into characters by thresholding. Consider, for example, an image of black text on a white background. A histogram of all the intensity values in the image will have two dominant peaks: one peak corresponding to the intensity value of the black text, and a second peak corresponding to the intensity value of the white background. If a threshold is set at an intensity value that is in the bottom of the valley between the two peaks, then any pixel having an intensity value darker than the threshold may be assigned to text, and any pixel having a intensity value lighter than the threshold may be assigned to background.

In the case of black text on a white background, a constant global threshold may be determined from a intensity value histogram of the entire image. However, many images of interest are more complex than just black text against a white background. For example, an image may include blocks of color (that is, the background may vary), text may overlap blocks of different colors, and text may be lighter than the local background. For complex images, the threshold may be dynamic, varying depending on the location of the pixel of interest within the image. A dynamic threshold may be dependent on intensity value data over a region of an image, or a dynamic threshold may vary from pixel to pixel. See, for example, Joan S. Weszka, "A Survey of Threshold Selection Techniques", *Computer Vision, Graphics, and Image Processing* 7, 259–265 (1978) and Sahoo et al., "A Survey of Thresholding Techniques", *Computer Vision, Graphics, and Image Processing* 41, 233–260 (1988).

Particular problems for thresholding include determination of a suitable threshold at the boundaries of objects, determination of a suitable threshold for thin objects (where there are few object intensity values in the histogram), and determination of a suitable threshold when there are areas of interest that are lighter than the background.

There is a need for improved segmentation of complex images using bilevel thresholding.

SUMMARY OF THE INVENTION

For each pixel, a threshold is selected from a set of thresholds. In a first example embodiment, at least one threshold is variable, and one threshold is a constant value.

DETAILED DESCRIPTION OF THE PREFERRED EMBODIMENT OF THE INVENTION

Figure 1:
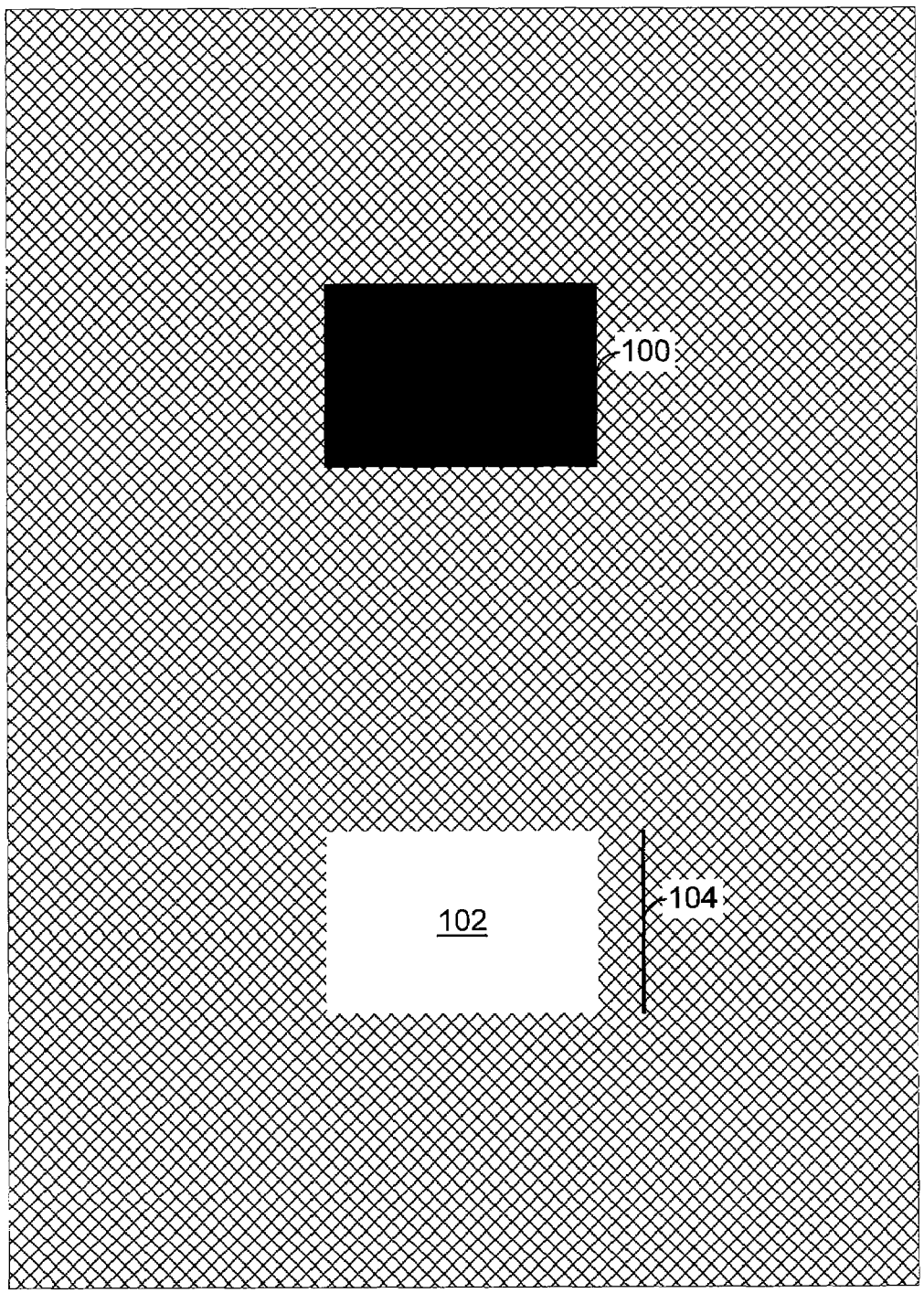
FIG. 1 illustrates a gray-scale image with regions of interest to illustrate bilevel thresholding resulting from several example thresholding methods.
Figure 2:
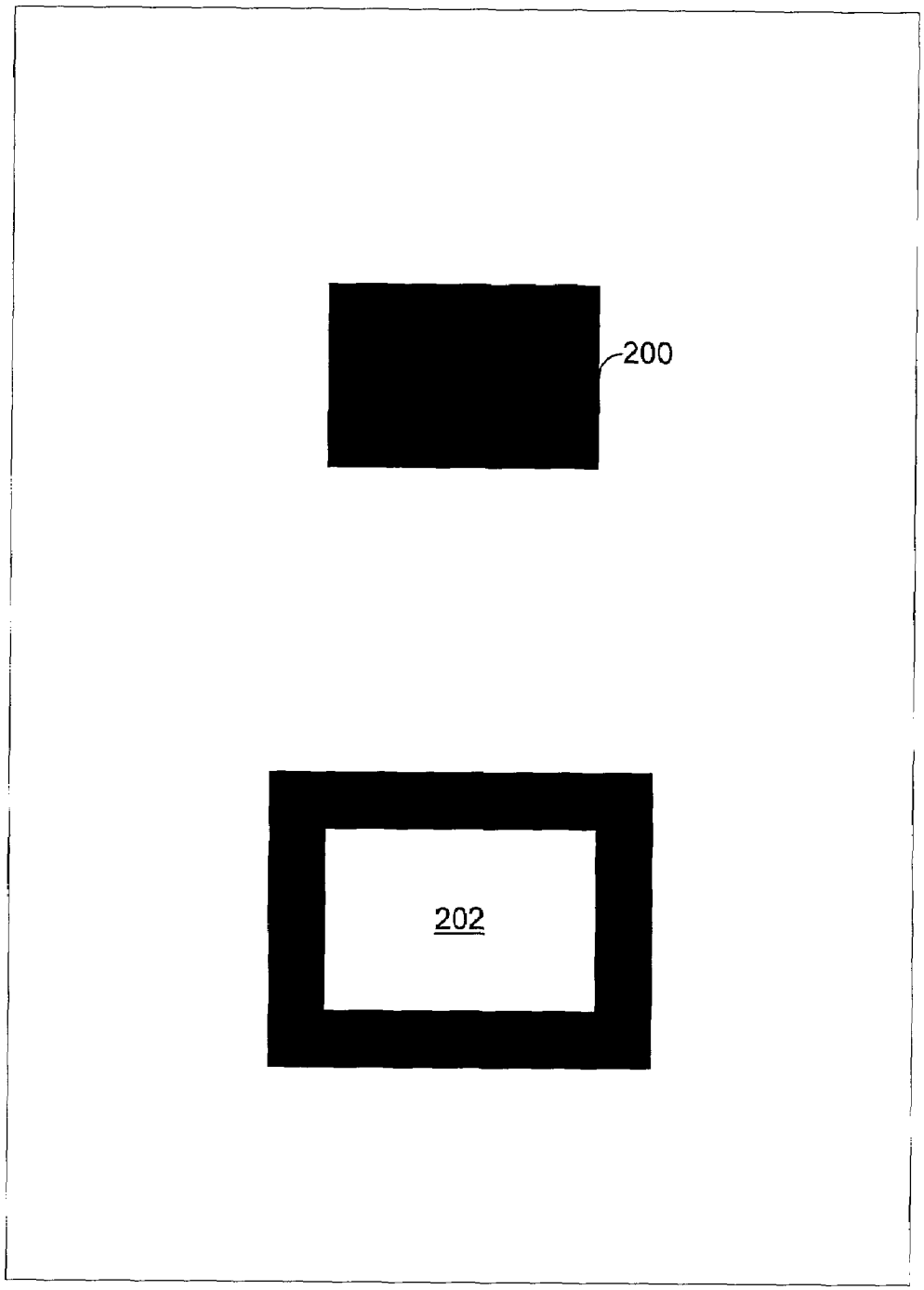
FIG. 2 is a binary image illustrating the result of applying a bilevel thresholding method to the image of FIG. 1, using a dynamic threshold that is constant within blocks (or cells, or tiles).
Figure 3:
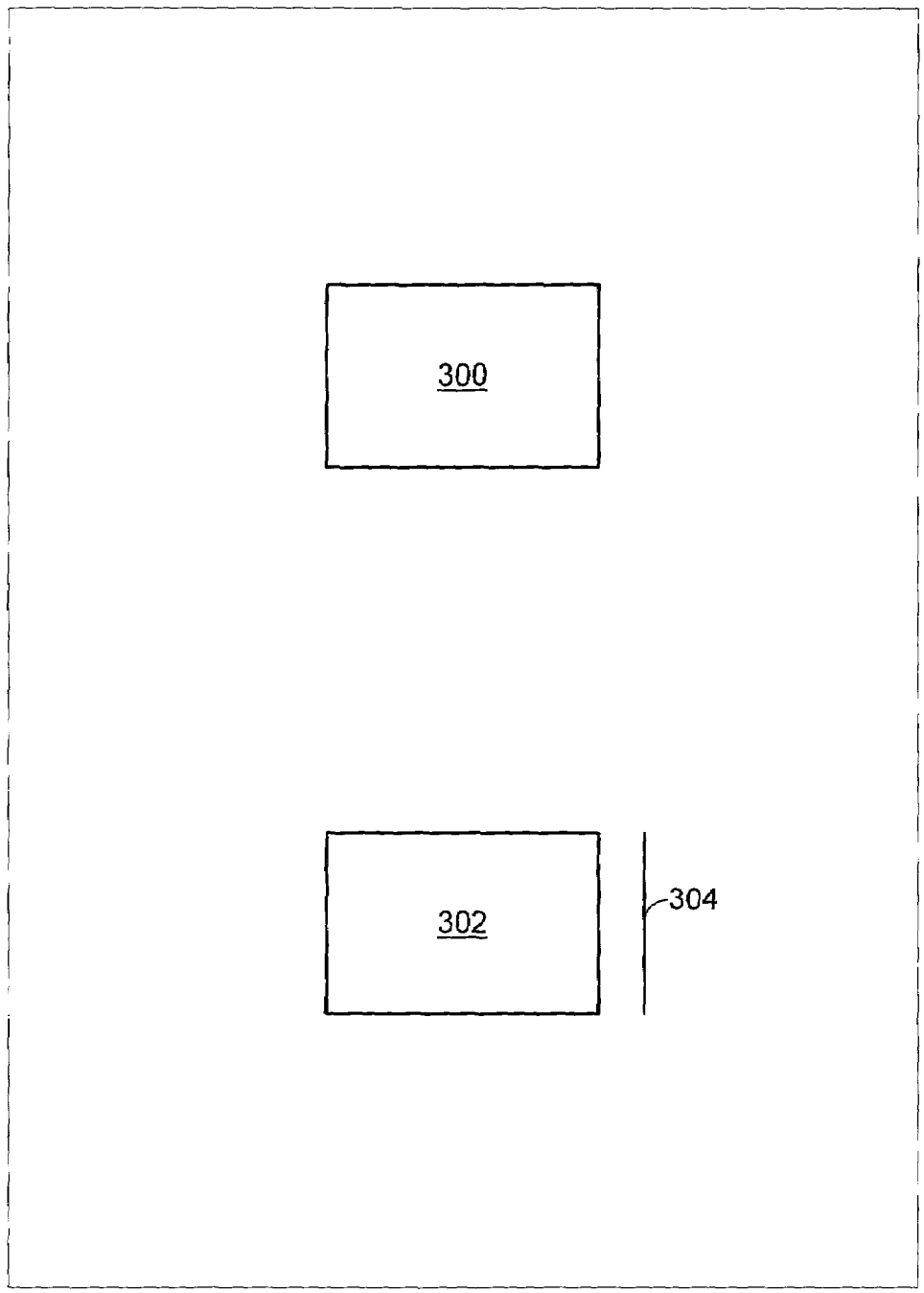
FIG. 3 is a binary image illustrating the result of applying a bilevel thresholding method to the image of FIG. 1, using a dynamic threshold that changes from pixel to pixel.
Figure 4:
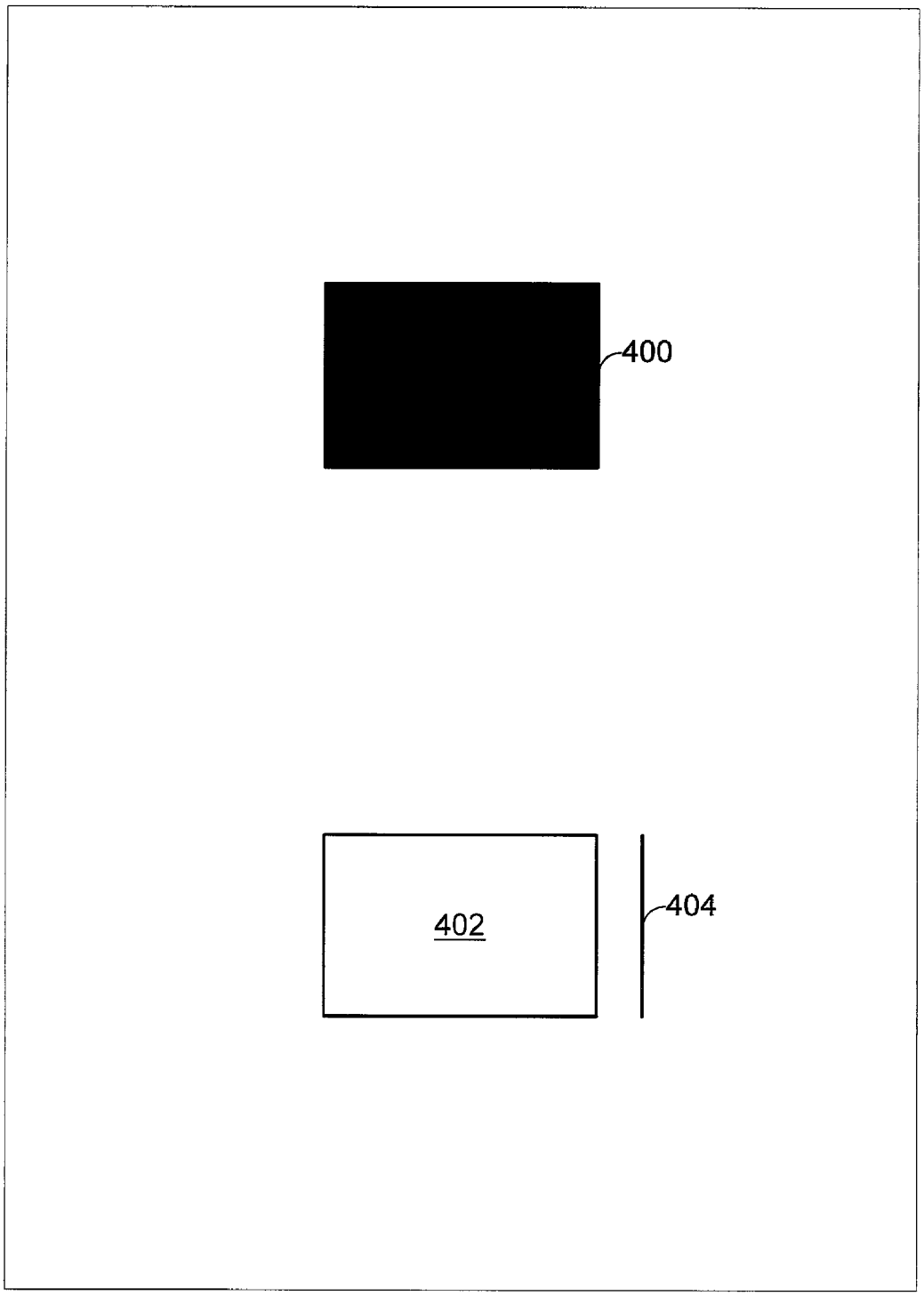
FIG. 4 is a binary image illustrating the result of applying a bilevel thresholding method to the image of FIG. 1, using a set of thresholds in accordance with an example embodiment of the invention.

FIG. 1 illustrates an image having a uniform gray background (depicted by cross-hatching) with a solid black area 100, a solid white area 102, and a relatively thin black line 104 near the solid white area 102. Note that the white area 102 does not have a black line border around it; it is simply a white area within the surrounding gray background. In the following discussion, two prior-art methods of bilevel thresholding are applied to an image like FIG. 1 with a uniform gray background, and the resulting binary images are illustrated (FIGS. 2 and 3). Then an example embodiment of a method in accordance with the invention is applied to an image like FIG. 1 with a uniform gray background, and the resulting binary image is illustrated (FIG. 4). It is important to note that due to limitations on what is permitted for patent illustrations, the gray background of FIG. 1 is not uniform, and is simulated by cross-hatching. FIGS. 2–4 illustrate the result of applying various bilevel thresholding algorithms to an image like FIG. 1 but having a uniform gray background, and do not illustrate the result of applying the same thresholding algorithms literally to FIG. 1 with its simulated gray background.

Note also in the following discussion that it is assumed that low intensity pixels have low numerical intensity values and that high intensity pixels have high numerical intensity values. This may be reversed, so that low intensities are represented by high numbers and vice versa, in which case the MAX functions become MIN functions, signs are reversed, and so forth.

FIG. 2 is a binary image illustrating the result of applying a bilevel thresholding method to the image of FIG. 1 (with a uniform background), using a thresholding method that is typical for some commercially available OCR software. The following is a simplified description of the general type of thresholding involved in producing FIG. 2, and may not correspond precisely to any particular commercially available software. An additional example may be found in U.S. Pat. No. 5,651,077, For the method illustrated in FIG. 2, the overall image of FIG. 1 is partitioned into blocks (also called cells, or tiles), for example, square blocks of 64×64 pixels. A co-occurrence matrix is computed for each block. Assume for simplicity of illustration that gray-levels only have 4 bits (gray levels 0–15). The co-occurrence matrix, may be, for example, a 16×16 array. An entry in the array for position (i,j) is the frequency of occurrence of adjacent pixels with gray levels i and j. A histogram is generated from the co-occurrence matrix including only those entries close to the diagonal. For blocks with distinct bi-modal histograms (for example, dark text on a light background) the threshold is computed to be near the histogram valley. For blocks without a distinct bi-modal histogram, for example, a unimodal histogram for a block within a background area, may be assigned a threshold similar to a nearby block with similar background and previously computed threshold.

When a threshold is computed for a block, the threshold may change significantly from one block to the next, sometimes resulting in block-sized artifacts. Blocks that include parts of white area 102 in FIG. 1 have a higher intensity threshold relative to blocks comprising only the background gray-level. As a result, the threshold near white area 102 may be greater than the intensity of the gray background, so that the gray-levels in areas near white area 102 in FIG. 1 may snap to black in the binary image, as illustrated by the wide black areas around area 202 in FIG. 2. As a result, a wide black frame is generated as an artifact in FIG. 2, and the black line 104 in FIG. 1 is completely lost in the binary image of FIG. 2.

FIG. 3 is a binary image illustrating the result of applying a bilevel thresholding method to the image of FIG. 1 (with a uniform background), using a thresholding method that varies the threshold on a pixel by pixel basis. For the particular example of FIG. 3, for each pixel, the threshold is the maximum intensity value among the K×K surrounding pixels, less a constant offset. This technique sets the threshold below the background for each pixel. In addition, the technique behaves as a high-pass filter, or edge detector. This has both advantages and disadvantages. Advantages include: (1) light areas are preserved as relatively narrow black frames with white interiors, without the artifacts of block-based methods, and (2) thin objects such as lines are preserved. A disadvantage is that large dark areas are reduced to frames with white interiors, rather than being preserved as dark areas.

Consider, for example, pixels near area 102 in FIG. 1. First consider a pixel where the K×K surrounding area includes only gray background pixels. The threshold is set to an offset below the intensity of the background, and the pixel under consideration is snapped to white. Now consider a pixel that has a background level intensity, but the K×K surrounding area includes part of area 102. Now the threshold is set to an offset just below white, and the pixel under consideration is snapped to black. Finally, consider a pixel where the K×K surrounding area includes only the white pixels of area 102. The threshold is again an offset just below white, and the pixel under consideration is snapped to white. As a result, in FIG. 3, the background snaps to white, and a black line results at each transition from gray to white and vice versa, thereby distinguishing area 302 within the white background in FIG. 3. Note also that the line 304 in FIG. 3, corresponding to line 104 in FIG. 1, is also distinguished.

Now consider pixels near area 100 in FIG. 1. Again, the background snaps to white. Consider a pixel just inside area 100, where part of the gray background is included in the K×K surrounding area. The threshold is set to an offset just below the gray background, and the black pixel under consideration is snapped to black. Now consider a pixel inside area 100 where the K×K surrounding area includes only black pixels. The threshold is set to an offset below black (or to a low intensity limit), and the black pixel under consideration is snapped to white. As a result, a solid black area 100 in FIG. 1 is rendered as a black frame with a white interior in FIG. 3. For some segmentation requirements, it may be preferable to render large dark areas in the gray-level image as black areas in the binary segmented image.

FIG. 4 is a binary image illustrating the result of applying a bilevel thresholding method to the image of FIG. 1 (with a uniform background), using a thresholding method in accordance with an example embodiment of the invention. In the example embodiment illustrated by FIG. 4, the threshold is determined on a pixel by pixel basis. The threshold is selected from multiple thresholds, at least one of which is dynamic. The thresholding method has particular advantages in OCR, but is not limited to OCR. In the example embodiment illustrated by FIG. 4, the threshold T for a pixel at row w, column c, is determined according to the following equation:

$$T(r,c) = \text{MAX}[\text{MAX}_K(r,c) - T1, T2] \qquad \text{Equation 1}$$

where:

$\text{MAX}_K(r,c)$ is the maximum intensity value of the K×K pixels surrounding pixel (r,c).

T1 is an intensity offset value, which may be a constant value.

T2 is an intensity value, which may be a constant value for an entire image.

Note that in the example of equation 1, the threshold T is selected from the highest intensity of two thresholds, one of which is dynamic and one of which is constant.

Consider the application of equation 1 to FIG. 1 (with a uniform background). Assume that T2 is an intensity that is lower than the background intensity minus T1. For all of FIG. 1 other than inside area 100, the variable threshold ($\text{MAX}_K(r,c) - T1$) will always be higher than T2. Note that other than inside area 100, the variable threshold is either the background intensity less T1, or is the white intensity less T1. Inside area 100, for pixels where the K×K surrounding pixels are all black, the variable threshold is less than T2, and T is selected to be T2. Accordingly, black pixels within area 100 snap to black, and the resulting binary image is as illustrated in FIG. 4.

When using Equation 1, in the binary segmented image, the frames around light areas will be approximately K pixels wide. K may be as small as K=2. If the input sampling rate is 300 pixels per inch, a suitable example value for K for OCR is K=7. T1 or T2 may vary by region or block, but remain constant within a region or block. However, there is a risk of artifacts at block boundaries. T1 needs to be large enough to ensure that [$\text{MAX}_K(r,c) - T1$] is well below the background to minimize noise. Accordingly, a suitable example value for T1 is about 30% of the intensity range for the overall image. A more accurate approach is to make T1 a function of the spread of the background. For example, in an histogram of the overall image, there may be a peak in the dark area caused by the background. T1 may then be made a multiple of the standard deviation of the data in the peak in the dark area, for example, twice the standard deviation. T2 may be determined based on the overall image, using any of the known techniques for determining a single threshold.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of segmenting an image, comprising:

selecting, for each pixel to be thresholded in the image, one threshold among a plurality of thresholds, based on the relative magnitudes of the thresholds; and assigning each pixel to one of two classes according to the value of its intensity relative to the selected threshold for the pixel.

2. The method of claim 1, further comprising:

selecting among at least one threshold that is dynamic, and a threshold that is constant.

3. The method of claim 1, further comprising:

selecting a threshold corresponding to the highest intensity value among the plurality of thresholds.

4. The method of claim 1, further comprising:

selecting the threshold having the largest magnitude among the plurality of thresholds.

5. An image processing system, comprising:

a processor having an input for receiving a digital image;

a memory medium, readable by the processor, containing a program to instruct the processor to perform the following method:

selecting, one threshold among a plurality of thresholds, based on the relative magnitudes of the thresholds; and, assigning each pixel in the digital image to one of two classes according to the value of its intensity relative to the selected threshold for the pixel.

6. A computer readable medium, containing a program to perform the following steps:

selecting, for each pixel in a digital image, one threshold among a plurality of thresholds, based on the relative magnitudes of the thresholds; and, assigning each pixel in the digital image to one of two classes according to the value of its intensity relative to the selected threshold for the pixel.

* * * * *